United States Patent [19]

Armbrust et al.

[11] Patent Number: 5,340,242

[45] Date of Patent: Aug. 23, 1994

[54] CHIP-BREAKING TOOLHOLDER WITH ADJUSTABLE ORIFICE CAP

[75] Inventors: William D. Armbrust, Cary; Randall E. Deemer, Wake Forest, both of N.C.

[73] Assignee: Kennametal Inc., Latrobe, Pa.

[21] Appl. No.: 766,499

[22] Filed: Sep. 25, 1992

[51] Int. Cl.$^5$ .................. B23B 27/10; B23B 27/22
[52] U.S. Cl. ............................. 407/11; 407/4; 407/6
[58] Field of Search ............... 407/11, 101, 81, 83, 407/89, 136; 408/56, 60, 61; 409/136

[56] References Cited

U.S. PATENT DOCUMENTS

| | | | |
|---|---|---|---|
| 2,683,303 | 7/1954 | Pigott | 29/106 |
| 3,230,802 | 7/1966 | Johnson | 407/11 |
| 3,323,195 | 6/1967 | Vanderjagt | 407/11 |
| 3,795,454 | 3/1974 | Elchyshyn | 408/60 |
| 3,808,656 | 5/1974 | Lindskog | 407/11 |
| 4,409,868 | 10/1983 | Huddle et al. | 407/11 |
| 4,621,547 | 11/1986 | Yankoff | 82/1 C |
| 4,636,118 | 1/1987 | Hunt | 409/136 |
| 4,695,208 | 9/1987 | Yankoff | 407/106 |
| 4,848,198 | 7/1989 | Royal et al. | 407/11 |
| 4,893,967 | 1/1990 | Briese | 407/7 |
| 4,955,264 | 9/1990 | Armbrust | 407/11 |

FOREIGN PATENT DOCUMENTS

| | | |
|---|---|---|
| 0100376 | 2/1984 | European Pat. Off. . |
| 3429842A1 | 8/1984 | Fed. Rep. of Germany .......... B23B 27/10 |
| 3429842 | 2/1986 | Fed. Rep. of Germany ........ 407/11 |
| 1279749 | 1/1961 | France ................................. 407/11 |
| 80896 | 1/1962 | France ................................. 407/11 |
| 636855 | 12/1979 | U.S.S.R. .............................. 407/11 |
| 1321555 | 7/1987 | U.S.S.R. .............................. 407/11 |
| 1342602 | 10/1987 | U.S.S.R. .............................. 407/11 |
| 1355447 | 11/1987 | U.S.S.R. .............................. 407/11 |

OTHER PUBLICATIONS

Modern Machine Shop; "Bye Bye Birds' Nests," by Ken M. Gettelman, Sep., 1991, pp. 54–62.

*Primary Examiner*—Steven C. Bishop
*Attorney, Agent, or Firm*—James G. Porcelli

[57] ABSTRACT

A toolholder includes a support having an insert seat for receiving a cutting insert. The cutting insert is brought into engagement with a workpiece to remove a chip of metal from the workpiece. The toolholder includes fluid chip-breaking means for directing a stream of high velocity fluid at the chip being removed from the workpiece to break the chip into small segments. The direction of the fluid stream can be adjusted so that a single tool can be used perform a variety of cuts while optimizing the effectiveness of the fluid chip-breaking stream for each cut.

13 Claims, 4 Drawing Sheets

CHIP-BREAKING TOOLHOLDER WITH ADJUSTABLE ORIFICE CAP

FIELD OF THE INVENTION

The present invention relates generally to machine toolholders for holding a cutting insert adapted to engage a workpiece and remove a chip therefrom, and more particularly to hydraulic chip-breaking toolholders which use a high velocity fluid stream to break the chip removed from the workpiece into small segments.

BACKGROUND OF THE INVENTION

Metal work cutting tools generally include a disposable cutting insert and a toolholder adapted to firmly hold the cutting insert. The cutting insert is brought into contact with a metal workpiece while the workpiece is rotated to remove a chip from the workpiece. There is a tendency for removed chips to form long, continuous strands rather than break into small segments. These long strands spiral and cause hot metal liberated from the workpiece to remain in contact with the cutting insert for a longer duration and often tangle up with the workpiece or the toolholder. If the strand tangles up with the workpiece or the toolholder, the operation must be halted so that the strand may be manually broken. As most metal working operations are intended to operate nearly automatically, this is a very undesirable and expensive task. Furthermore, the life of a cutting insert, generally being formed from carbide steel or a similar metal, is heavily dependent upon operation temperature. Under normal conditions, the cutting insert is exposed to intense heat generated in cutting chips from the workpiece. This heat is significantly increased when hot metal chips remain in contact with the cutting insert for an extended duration as they do when the chips form continuous strands.

The need to break chips to avoid stranding is well understood and recognized in the metal working industry. A great deal of design and experimentation has been devoted to the development of efficient and effective means for breaking chips. For example, some inserts are designed with integrally formed chip-breakers. Such chip-breakers usually comprise an obstruction in the path of the chip for deflecting and curling the chip. By bending the chip to the limit of its ductility, the chip breaks into small segments.

Another method of chip-breaking is to direct a high velocity stream of coolant at the chip. The stream bends the chip and cools it, making it more brittle. This combination of effects causes the chips to break off into smaller segments rather than form long strands. The coolant also serves to cool the cutting insert thereby extending its operational life.

Methods have been developed for directing a high velocity fluid stream at the cutting insert which use an external fluid line attached to the toolholder. Often, several tools will be used to work on a single workpiece, necessitating changing of the toolholders. The additional steps of disconnecting and reconnecting the external fluid line significantly decrease the speed and efficiency of toolholder replacement.

A tool assembly disclosed in U.S. Pat. No. 4,955,264, has been developed which obviates the need for an external fluid line. This tool assembly includes a coolant passage formed in the toolholder and a cap having a constricted outlet attached to the outlet of the passageway. While this apparatus solves the problem of conventional tool assemblies, it has a significant limitation. Often a single tool assembly may be used to make several different cuts on a workpiece. These different cuts may be at different depths, angles, and/or directions. As a result, different portions of the cutting insert contact the workpiece and the removed chips differ in character. For different cuts, it is desirable to alter the direction of the high velocity coolant stream to provide optimal flow across the insert and against the chip. In the described design, the direction of the coolant stream may only be altered by changing caps, each cap outlet having a particular angle of inclination to the cutting insert.

Therefore, there is a need for conveniently and efficiently adjusting the direction of the high velocity coolant stream from a coolant supply system forming an integral part of a toolholder.

SUMMARY AND OBJECTS OF THE INVENTION

The present invention is a toolholder with an adjustable fluid chip-breaking means. The toolholder comprises a support bar formed with an insert seat for receiving a cutting insert. The insert includes a cutting edge for engaging a workpiece and removing a chip of metal from the workpiece. The fluid chip-breaking means directs a stream of high velocity fluid at the chip being removed from the workpiece to break the chip into small segments. The chip-breaking means includes an orifice cap mounted on top of the support bar. The orifice cap has a discharge passage terminating in a discharge orifice. A fluid inlet means is provided for delivering chip-breaking fluid to the orifice cap. Because different portions of the cutting insert may sometimes be used to perform different metal cutting operations, the toolholder of the present invention includes means for adjusting the direction of the fluid stream. More particularly, the adjusting means includes a pivot member about which the orifice cap rotates, and means for rotating the orifice cap about the pivot member.

Based on the foregoing, it is a primary object of the present invention to provide a toolholder having a fluid chip-breaking system for directing a stream of high velocity fluid at a chip removed from the workpiece to break the chip into small segments.

Another object of the present invention is to provide a toolholder of the type described above, wherein means are provided for adjusting the direction of the chip-breaking fluid stream.

Another object of the present invention is to provide a fluid, chip-breaking toolholder using a single orifice cap which can be easily and quickly adjusted without changing orifice caps.

Other objects and advantages of the present invention will become apparent and obvious from a study of the following description and the accompanying drawings which are merely illustrative of such invention.

DETAILED DESCRIPTION OF THE INVENTION

Figure 1:
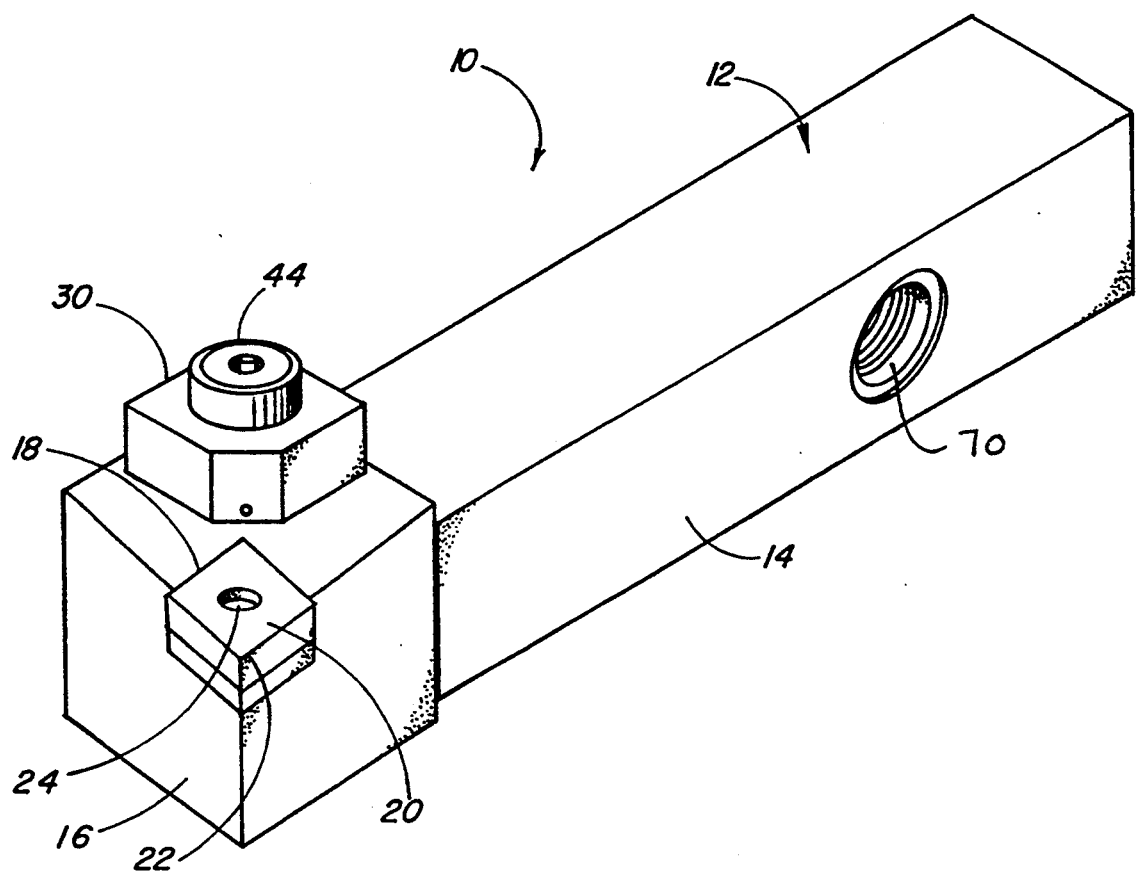
FIG. 1 is a perspective view of the toolholder of the present invention.
Figure 2:
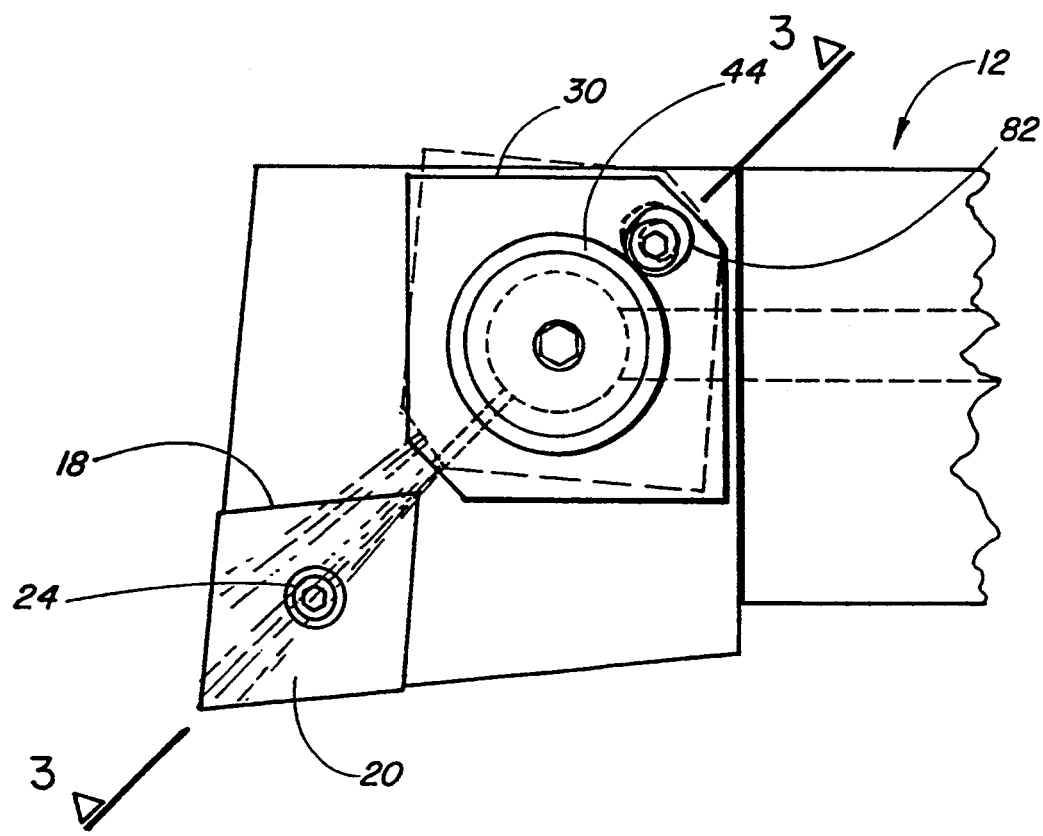
FIG. 2 is a partial plan view of the toolholder.

Referring now to the drawings, and particularly to FIG. 1, the chip-breaking toolholder of the present invention is shown therein and indicated generally by the numeral 10. The toolholder 10 includes a support bar 12 having a shank portion 14 and a head portion 16. The head portion 16 of the toolholder 10 includes an insert seat 18 in which a cutting insert 20 is received. The cutting insert 20 is secured in the insert seat 18 by a lock pin 24. The cutting insert 20 includes a cutting edge 22 for engaging a workpiece and removing a chip of metal from the workpiece.

Figure 4:
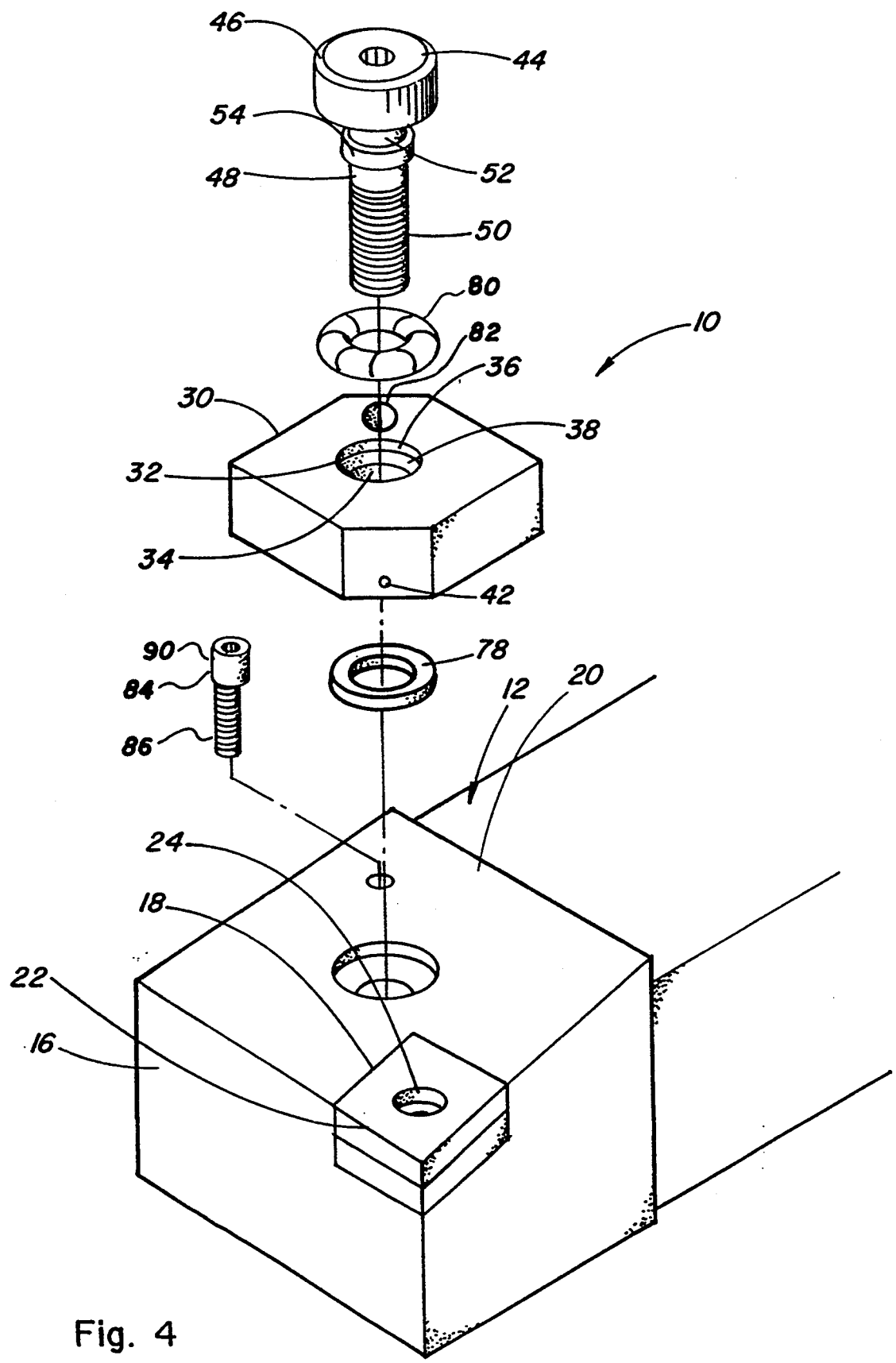
FIG. 4 is an exploded perspective view of the toolholder.

The toolholder includes a fluid chip-breaking system for breaking the chip removed from the workpiece into small segments. The fluid chip-breaking system includes an orifice cap 30 for directing a high velocity stream at the chip being removed from the workpiece, and a fluid inlet means for delivering chip-breaking fluid to the orifice cap 30. The orifice cap 30 is mounted on top of the head portion 16 of the support bar 12 and is held by a cap screw 44. An opening 32 (See FIG. 4) is formed in the orifice cap 30 through which an intermediate portion of the cap screw 44 extends. The opening 32 includes an upper portion 36 and a lower portion 34. The lower portion 34 of opening 32 is smaller than the upper portion 36. A conical surface 38 is formed between the upper and lower portions 36 and 34. A discharge passage 40 extends from the lower portion 34 of opening 32 to a forwardly directed surface of the orifice cap where it terminates in a discharge orifice 42.

Figure 3:
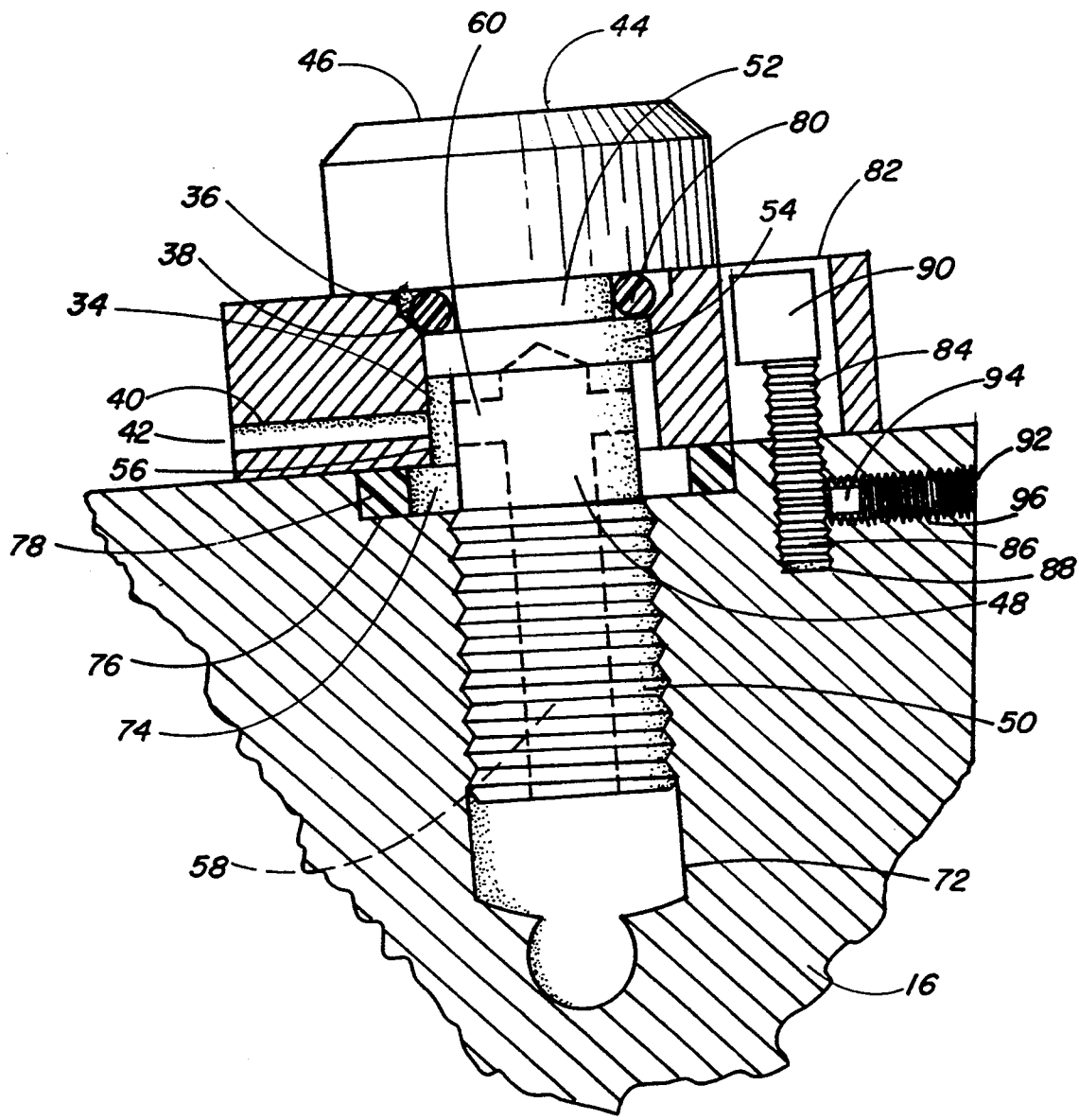
FIG. 3 is a sectional view of the toolholder taken through line III—III of FIG. 2.

The cap screw 44 includes a screw head 46, and a shank which comprises an intermediate portion 48 and a threaded end portion 50. The end portion 50 threadably engages with a cap screw hole 72 (FIG. 3) formed in the head portion 16 of the support bar 12. The cap screw hole 72 includes a counterbore 74 surrounding the cap screw hole 72 which defines a shoulder 76. An o-ring seal 78 is disposed in the counterbore 74. When the cap screw 44 is tightened, the o-ring seal 78 is compressed between the orifice cap 30 and the shoulder 76 to prevent fluid from escaping from underneath the orifice cap 30. A second o-ring seal 80 is disposed in an annular groove 52 between the head 46 of the cap screw 44 and annular ring 54. The seal 80 is compressed against the conical surface 38 to prevent fluid from escaping through the gap between the screw head 46 and the orifice cap 30.

The fluid inlet means for delivering chip-breaking fluid to the orifice cap 30 includes an inlet passage 70 (FIG. 1) which extends through the shank portion 14 of the support bar 12 into the head portion 16. The inlet passage 70 intersects the cap screw hole 72. Chip-breaking fluid passes from the inlet passage 70 through an access hole 58 formed in the cap screw 44. The access hole 58 extends from the end portion 50 of the cap screw 44 into the intermediate portion 48. A radial opening 60 passes diametrically through the intermediate portion 48 of the cap screw and intersects the access hole 58. An annular channel 56 is defined between the intermediate portion 48 of the cap screw and the inner surface of the opening 32. The annular channel 56 aligns with the discharge passage 40 in the orifice cap 30. Chip-breaking fluid exits the cap screw 44 through the radial hole 60, flows around the shank in the annular channel 56 defined between the intermediate portion of the shank and the inner surface of the opening 32. The fluid enters the discharge passage 40 in the orifice cap 30. In flowing from the access hole 58 through the discharge passage 40, the chip-breaking fluid accelerates and exits the discharge orifice 42 as a high velocity, fluid stream. The discharge orifice 42 directs the fluid stream just above the cutting edge of the insert 20 to break the chip being removed by the insert 20 into small segments.

An adjustment means is provided for adjusting the direction of the fluid stream exiting the orifice cap 30. Such adjustments may be necessary when making different cuts with the same tool. The adjustment means comprises a cam pin hole 82 formed in the orifice cap 30 in spaced relation to the axis of the cap screw 44. A cam pin 84 cooperates with the inner surface of the cam pin hole 82 to rotate the orifice cap 30 about the axis of the cap screw 44, which functions as a pivot member. More particularly, the cam pin 84 includes a shank portion 86 threadably engaged with a cam screw hole 88 formed in the head portion 16 of the support bar 12. The cam pin 84 includes an eccentric head 90 which is received in the cam pin hole 82 of the orifice cap 30. The eccentric head 90 of the cam pin 84 acts as a cam, while the inner surface of the cam pin hole 82 acts as a cam follower. Thus, when the cam pin 84 is rotated, it exerts a mechanical force on the orifice cap 30 causing the orifice cap 30 to rotate about the cap screw 44. To prevent the cam pin 84 from binding, the cam pin hole 82 must be elongated slightly along a line extending through the center of opening 32 to provide room for the cam pin 84 to move back and forth.

A locking means is provided for locking the cam pin 84 in a fixed position. In particular, a set screw hole 92 is formed in the head portion 16 of the toolholder 12 which intersects the cam screw hole 88. A set screw 96 forces a plug 94 made of brass or nylon against the shank 86 of the cam pin 84 to prevent the cam pin 84 from inadvertently rotating out of position. This would allow the orifice cap 30 to be replaced without having to readjust the new orifice cap 30.

To use the toolholder of the present invention, the cap screw 44 is slightly loosened to permit the orifice cap 30 to rotate about the cap screw 44. After loosening the cap screw 44, the cam pin 84 is turned to adjust the direction of the fluid chip-breaking stream. When properly adjusted, the cap screw 44 is retightened to secure the orifice cap 30 in the adjusted position. The toolholder is then used in a conventional manner to perform metal working operations.

From the forgoing, it is apparent that the present invention provides a fluid, chip-breaking toolholder in which the direction of the fluid stream can be easily and quickly adjusted. The toolholder of the present invention therefore eliminates the need for changing orifice caps to perform different metal working operations. Accordingly, significant savings in costs may be realized.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A toolholder comprising:

a) a support bar having an insert seat for receiving a cutting insert, said insert including a cutting edge for engaging a workpiece and removing a chip therefrom;

b) fluid chip-breaking means for directing a high velocity, fluid stream at the chip being removed from the workpiece to break the chip into small segments, wherein chip breaking means includes an orifice cap mounted on the support bar and including a discharge orifice for directing the fluid stream; and c) adjusting means for adjusting the direction of the fluid stream, wherein said adjusting means includes a pivot member having an axis therethrough about which the orifice cap rotates and includes means for rotating the orifice cap about the pivot member, said means for rotating being in spaced relation to said pivot member axis.

2. The toolholder according to claim 1 wherein the chip-breaking means includes fluid inlet means for supplying chip-breaking fluid to the orifice cap.

3. The toolholder according to claim 2 wherein the fluid inlet means includes an inlet passage extending through the support bar.

4. The toolholder according to claim 3 wherein the fluid inlet means includes transfer means for transferring fluid from the inlet passage in the support bar to the orifice cap.

5. The toolholder according to claim 1 wherein the rotating means includes a cam member connected to the support bar and a cam follower formed on the orifice cap and engaged with the cam member.

6. A toolholder comprising:

a) a support bar having an insert seat for receiving a cutting insert, said insert including a cutting edge for engaging a workpiece and removing a chip therefrom;

b) fluid chip-breaking means for directing a stream of high velocity fluid at the chip being removed from the workpiece to break the chip into small segments, said chip-breaking means including:

1) an orifice cap mounted on the support block and including a discharge passage terminating in a discharge orifice for directing the high velocity stream at the chip;

2) fluid inlet means for supplying chip-breaking fluid to the orifice cap; and c) means for adjusting the direction of the fluid stream exiting the discharge orifice, wherein the adjusting means includes a pivot member having an axis therethrough about which the orifice cap rotates and includes means for rotating the orifice cap about the pivot member, said means for rotating being in spaced relation to said pivot member axis.

7. The toolholder according to claim 6 wherein the rotating means includes a cam member and a cam follower formed on the orifice cap and engaged with the cam member.

8. The toolholder according to claim 6 wherein the fluid inlet means includes an inlet passage extending through the support bar, and fluid transfer means formed in the pivot member in fluid communication with both the inlet passage in the support member and the discharge passage in the orifice cap for transferring fluid from the inlet passage into the discharge passage of the orifice cap.

9. The toolholder according to claim 8 wherein the fluid transfer means includes an annular recess extending around the pivot member and aligned with the discharge passage and a transfer passage extending through the pivot member, said transfer passage including an inlet opening in fluid communication with the inlet passage of the support member and an outlet opening in fluid communication with the annular recess.

10. A toolholder comprising:

a) a support bar having an insert seat for receiving a cutting insert, said insert including a cutting edge for engaging a workpiece and removing a chip therefrom;

b) an orifice cap mounted on the support bar and including a final passage terminating in a discharge orifice for directing a high velocity, fluid stream at the chip being removed from the workpiece to break the chip into small segments;

c) means for securing the orifice cap to the support bar, wherein the means for securing the orifice cap comprises a cap screw with an axis therethrough, said cap screw extends through an opening in the orifice cap, and wherein the support bar includes a cap screw hole for threadably engaging the cap screw;

d) an inlet passage extending through the support bar and connected to a fluid source;

e) transfer means for transferring fluid from the inlet passage to the final passage of the orifice cap; and f) means for rotating the orifice cap to adjust the direction of the fluid stream exiting the discharge orifice, said means for rotating being in spaced relation to said cap screw axis.

11. The toolholder according to claim 10 wherein the inlet passage is in fluid communication with the cap screw hole, and wherein the fluid transfer means comprises a fluid transfer passage formed in the cap screw.

12. The toolholder according to claim 11 wherein the adjusting means includes a pivot member about which the orifice cap rotates, and means for rotating the orifice cap about the pivot member.

13. The toolholder according to claim 12 wherein the rotating means includes a cam member connected to the support bar and a cam follower formed on the orifice cap and engaged with the cam member.

* * * * *